Feb. 24, 1970  J. M. MᶜGREW, JR., ET AL  3,497,276
PIVOTED PAD BEARING
Filed Oct. 2, 1968  2 Sheets-Sheet 1

Inventors:
John M. McGrew, Jr.
Juergen M. Tessarzik,
by [signature]
Their Attorney.

United States Patent Office 3,497,276
Patented Feb. 24, 1970

3,497,276
PIVOTED PAD BEARING
John M. McGrew, Jr., Schenectady, and Juergen M. Tessarzik, Schoharie, N.Y., assignors to General Electric Company, a corporation of New York
Filed Oct. 2, 1968, Ser. No. 764,521
Int. Cl. F16c 17/06, 33/66
U.S. Cl. 308—73
5 Claims

ABSTRACT OF THE DISCLOSURE

Stable pivoted pad bearing operation is achieved by a pivoted pad supporting structure which enables the pivoted pad to operate under various conditions of pad load and pivot circle clearance ratio over the range of operation of the bearing. At low speeds the pad is free floating, at intermediate speeds the pad is operated under substantially constant pivot circle clearance ratio, and at high speeds, the pad is operated at substantially constant load. The aforementioned conditions are achieved by a stem support structure for the pad which has a stop and allows the pad to float free over the low speed range, and has a preload force applied thereto by a spring which enables the pad to operate under constant pivot circle clearance ratio over the intermediate range of speeds. The spring has a small spring gradient to enable the pad to operate under essentially constant load over the higher ranges of speed.

---

The present invention relates to self-acting journal bearings and in particular relates to such bearing of pivoted pad type adapted to operate over a wide range of speeds.

One of the crucial parameters governing the operation of a complete bearing of the pivoted pad type is the setting of the pivot circle clearance $C'$, which is the difference between the radius of the pivot circle and the radius of the journal supported thereby. A pivot circle clearance setting suitable for stable operation at high speeds may produce unstable operation at low speeds. At low speeds, a shaft will operate at very high eccentricity ratios $e'$ with respect to the pivot circle clearance setting, and the pivot film thickness of the top pad or shoe may become larger than the radial clearance machined into the top shoe. If the top shoe should vibrate or be disturbed in any way from its equilibrium position, when operating under the above conditions, the hydrodynamic restoring moment becomes negative causing the shoe to rotate about its pivot until the leading edge of the shoe touches the shaft. In this locked-in position, the shoe forms a diverging fluid film clearance space which in turn creates a low pressure region keeping the shoe in contact with the shaft and leading to failure in most cases.

To avoid such results, several solutions have been proposed in the prior art. One method is to stabilize the shoe by the application of external moments and thus physically raise the leading edge and maintain normal shoe attitude or angle of inclination. This method of not satisfactory as it is such attitude which creates the load carrying converging clearance space in the bearing. The second method proposed in the prior art is proper choice of $C'/C$ such that at the lowest predicted operating speed a stable converging clearance is maintained under the top shoe. The proper choice of the ratio $C'/C$ is dictated by the requirement that $$hp3 < C$$

or, $$Hp3 < 1$$

for stable operation, where:

$C'$ represents bearing pivot circle clearance,
$C$ represents ground-in pad clearance, i.e., radius of bearing surface of the pad minus the radius of the journal,
$Hp3$ is equal to the pivot film thickness under the top pad, and
$Hp3 = hp3/C$ Preferably, the clearance circle ratio $C'/C$ is maintained with the range of 0.2 to 0.8 for stable operation of the top pad. This second method usually requires operation at small $C'/C$ ratios which means power losses will be high. The third method proposed in the prior art uses spring loading on the top shoe. Such a method, however, imposes a high load even at standstill and low speeds and the starting torque with such an arrangement increases with top shoe loading. For applications which start and stop dry, such an arrangement is distinctly disadvantageous.

Accordingly, a primary object of this invention is to provide an assembly for pivot bearing pads which is stable in operation over the entire operating speed range yet avoids the disadvantages of the prior art.

It is another object of the present invention to provide a top pivot pad load which is small at low speeds for ease of starting, provides a high load at high speeds for pad stability and yet allows the bearing clearance to adjust to differential thermal and centrifugal growth of shaft under stable conditions.

In accordance with an exemplary embodiment of the present invention, there is provided assembly for supporting a top pivot pad of a journal bearing including a stem having its axis radially oriented with respect to the journal to be supported by the bearing and movable in the direction of the journal. A joint is provided at the end of the stem adjacent the pad to permit the pad to move along the axis of the stem, that is radially, as well as pivotally about the end of the stem. Also, stopping means is provided for limiting the movement of the stem radially inward and is set to allow the pad to move in a radial direction between a position in which the pad is in contact with the stem and a position in which the bearing surface of the pad is in contact wtih the journal. A spring engaging the stem applies a predetermined preload force on the stem in a radial direction urging the stem toward said journal and against the stopping means. Accordingly, in the operation of the complete bearing with such a top pad assembly, the pad is operated at constant load corresponding to the weight of the pad from standstill to a first speed corresponding the speed at which the fluid forces on the top pad equals the weight of the pad. The pad is operated at a constant pivot circle clearance ratio from the aforementioned first speed to a second speed corresponding to the speed at which the fluid forces on the pad equal the weight of the pad and the preloading of the spring. Thereafter, the bearing operates at substantially constant load corresponding to the load of the pad and the spring preload. There will be a slight increase in the pad loading depending upon the choice of the spring gradient. For small spring gradients such increase in loading is small in relation to the total loads.

The features of our invention which we desire to protect herein are pointed out with particularity in the appended claims. The invention itself, however, both as to its organization and method of operation together with further objects and advantages thereof may best be understood by reference to the following description taken in connection with the accompanying drawings wherein:

Figure 1:
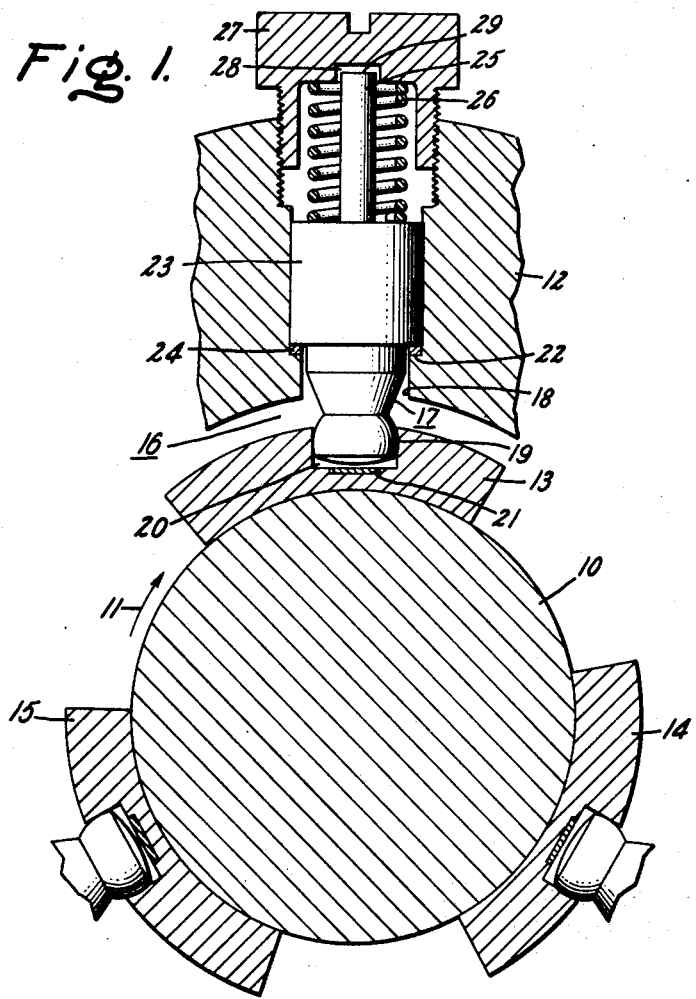
FIGURE 1 represents an end view in section of a pivot pad journal bearing showing the details of the top pivoted pad assembly of an embodiment of the present invention.

Referring now to FIGURE 1, a shaft 10 rotating in the direction indicated by arrow 11 is supported in a cylindrical bearing housing 12, only part of which is shown, by three pivoted bearing shoes or pads 13, 14 and 15. The assembly for the top pad 13 incorporates the principles of the invention. The two bottom pads 14 and 15 are conventionally supported and pivoted in the bearing housing 12. The apparatus of FIGURE 1 is shown in simplified form and not necessarily to scale for purposes of clearly showing the elements of the present invention and the manner of their functioning to achieve the advantages thereof. The top bearing pad assembly 16 includes a stem member 17 having its axis radially oriented with respect to the journal 10 and fitted into a radially oriented cylindrical opening 18 in the bearing housing 12 enabling the stem to move a limited amount in the radial direction as will be described in more detail hereinafter. At the end of the stem 17 adjacent the bearing pad 13 a ball type termination 19 is provided which fits into a socket or receptacle 20 in the top of the bearing pad 13. A wear-resistant insert 21 is provided in the bottom of the receptacle. The fit is such as to enable the pad to pivot about that end of the stem 17. The movement of the stem radially inward is restrained by a stop in the form of an upward extending shoulder 22 provided in the opening 18 by an enlargement of the diameter thereof on which the lower end of an enlarged cylindrical portion 23 or collar about the stem abuts. A washer 24 is provided between the abutting surfaces of shoulder 22 and cylindrical portion 23 for initial clearance settings. The thickness of the washer 24 controls the position of the collar 23 to limit the travel of the end of the stem 17 in the radial direction so that the pad 13 may travel in the radial direction free of the end of the stem and rest on the journal 10. The precise manner of setting the spacing between the end of the stem and the journal will be described in greater detail hereinafter. The proper setting of the stop will be appreciated from a description of the operation of the invention set forth below.

The upper end 25 of the stem 17 is reduced in diameter. A coil spring 26 coaxial with the upper end 17 of the stem is provided. The lower end of the spring 26 bears on the upper shoulder of the collar 23 and the upper portion of the spring 26 bears against the under surface of an adjusting nut in threaded engagement with the wall of the enlarged upper portion opening 18. The under side of the nut 27 has a cylindrical recess 28, the base of which is spaced from end 29 of stem 17 when the collar 23 is against the shoulder 22. The adjustment of the nut 27 controls the force applied or exerted by the spring on the stem urging it against its stop, shoulder 22, and is referred to as the preload. The spacing between the end 29 of stem 17 and the base of recess 28 of nut 2 is set so that after a predetermined amount of travel the pad 13 operates under substantially constant pivot pad clearance circle ratio to avoid instabilities and damage to the machine at the upper speed range of operation thereof.

Referring now to the operation of the assembly 17, at standstill the top pad 13 operates under the constant load of its own weight. When the pad film thicknesses become large enough, the initial pivot circle clearance of the bearing is taken up and the pad 13 is forced against its support stem 17. The bearing then operates at a constant pivot circle clearance ratio $C'/C$ and the top pad load continues to increase until it reaches the value of the spring preload, i.e., force produced by initial deflection of spring 26, and the weight of the pad. At this point, the top pad 13 begins to rise and the top shoe again operates at constant load, that is the load which is the sum of the spring load and the pad weight. As shown, an upper stop 28 can be employed if it is desired to limit the total travel of the top shot for reasons of stability or safety at the upper limits of speed of operation of the bearing.

Figure 2:
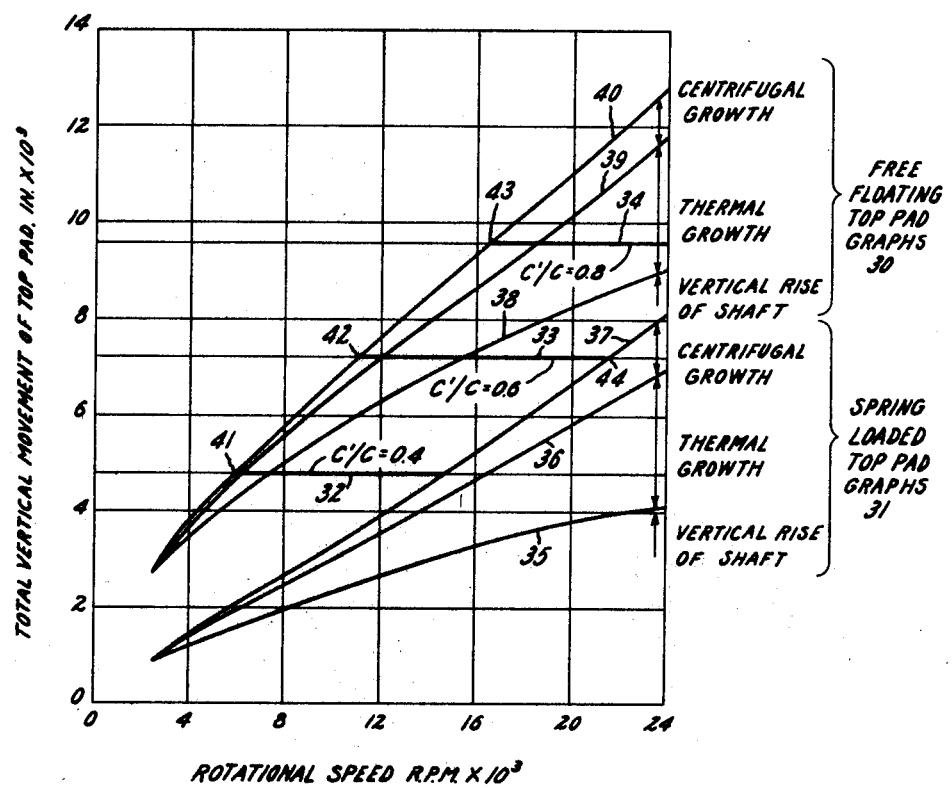
FIGURE 2 shows two sets of graphs useful in explaining the operation of the present invention.

Referring now to FIGURE 2, there is shown two sets 30 and 31 of graphs for a typical bearing useful in explaining the principles of the invention and particularly the operation of the bearing system of FIGURE 1. One set 30 which is for a free-floating top pad and the other set 31 which is for a spring loaded top pad are plotted on coordinates in which the ordinate represents total vertical movement of the top pad and the abscissa represents rotational speed. The modes of operation in which $C'/C$ ratios are utilized for the intermediate range of speeds are depicted in the form of solid lines 32, 33, and 34 representing $C'/C$ ratios of .4, .6 and .8, respectively. While these graphs are for a large bearing, approximately four inches in diameter in which the fluid lubricant is air and in which the ratio of pad arc to arc from lead edge of pad to pivot point is 0.6 and the bearing compressibility parameter of the air is 0.5, it will be appreciated that the graphs are representative of the operation of bearings generally. The bearing compressibility parameter is equal to $$6\mu\omega R^2/P_a C$$

where:

$\mu$ is lubricant viscosity,
$\omega$ is angular velocity,
R is shaft radius,
$P_a$ is ambient pressure, and
C is pivot circle radial clearance.

Consider first the set 31 of graphs relating to spring loaded top pad. Graph 35 represents the total movement of the top pad in response to the vertical rise of the shaft as a function of the rotational speed of the shaft in a complete bearing. Graph 36 represents the total vertical movement of the top pad in a complete bearing resulting from the vertical rise of the shaft in the bearing plus the thermal growth of the shaft and finally graph 37 represents the total vertical movement of the top pad as a function of speed for the complete bearing as a result of the vertical rise of the shaft plus thermal growth plus centrifugal growth in the shaft.

Referring now to the set 30 of graphs relating to the free-floating top pad, graph 38 represents a total vertical movement of the top pad which is free floating resulting simply from the forces created in the complete bearing as a function of speed. Graphs 39 and 40 represent the total vertical movement of the pad under conditions in which thermal growth and centrifugal growth, respectively, are taken into account. Points 41, 42 and 43 on the free-floating top pad set of graphs represent points at which the pivot circle clearance ratio are .4 and .6 and .8, respectively. In the operation of a free-floating pad should it be desired to operate at these ratios the shoulder 22 is set in relation to collar 23 by the washer 22 so as to allow the pad to rise to that value before the constant load represented by the weight of the pad is increased. A preload force is applied by setting of spring so as to maintain the desired constant pivot circle clearance ratio. A constant pivot circle clearance ratio in the range from .2 to .8 results in stable pad operation. Pivot circle clearance ratios in excess of 0.8 and close to unity result in pad operation which easily become unstable.

The operation of the assembly of FIGURE 1 will now be considered in connection with the graphs of FIGURE 2 for the example where the clearance ratio desired to be maintained in the intermediate range of speed is .6. Accordingly, the point 42 is physically set so that at the indicated speed approximately 11,000 r.p.m. the pad 13 just engages the lower end of the stem 17. A spring preload is applied by spring 26 to retain the stem with the collar 23 via the washer 24 abutting the shoulder 22, that is, operating at the constant $C'/C$ ratio of .6. The point 44 on the spring loaded top pad set of curves represents at the speed indicated as approximately 22,000 r.p.m. at which the stem begins to rise off the collar, assuming sufficient preload force has been applied. Operation beyond the speed corresponding to point 44 would be under substantially constant loads as the spring constant of spring is small, i.e., the deflection of spring to produce the preload force is relatively large in relation to the rise of the top pad. Accordingly, at low speeds the only load on the top shoe is the pad weight. As speed increases, the rise of the shaft plus top pad film thickness plus any shaft growth forces the pad against the stem. The load on the top pad gradually increases with the bearing operating at approximately constant $C'/C$ ratio until it matches the spring preload force. At this point, the top stem begins to rise and the top pad operates under essentially constant load, that is the spring preload force and the weight of the pad, assuming of course that the spring constant is small.

While the invention has been described for a bearing in which air was the lubricant and it had a bearing compressibility parameter of .5 for the speed range of operation, it will be appreciated that the invention is not limited to air as the lubricating fluid but may include other gases as well and applies to bearings operated at considerably higher speeds and considerable bearing compressibility parameters. Also, while the invention has been described in connection with a bearing for supporting a horizontal shaft, the invention is applicable to bearings with other support orientations, for example, vertical.

Accordingly, while we have shown a particular embodiment of our invention, it will, of course, be understood that we do not wish to be limited thereto since many modifications and variations may be made in the structural arrangement shown and in the instrumentalities.

What we claim as new and desire to secure by Letters Patent of the United States is:

1. In combination,
   a rotatable shaft having a journal,
   a bearing for supporting the journal portion of said shaft,
   a bearing support structure surrounding said journal for supporting said bearing, said bearing including a plurality of pivoted pads, one of said pivoted pads including a pad having a bearing surface and a surface opposed thereto, said opposed surface including a receptacle, a stem having its axis radially oriented with respect to said journal and movable in the direction of said axis, said stem having an end fitted in said receptacle of said pad so as to permit movement of said pad along the axis of said stem as well as pivotally about said end,
   stop means for limiting the movement of said stem radially inward, said stop means set to allow said pad to move in a radial direction between a position in contact with the end of said stem and a position in which said bearing surface is in contact with said journal,
   spring means for applying a predetermined force on said stem directed radially inward toward said journal and against said stop, whereby said pad is operated at constant loads from standstill to a first speed corresponding to a speed at which the fluid force exerted by the fluid of said bearing on said pad equals the weight of said pad, is operated at constant pivot circle clearance ratio from said first speed to a second higher speed corresponding to the speed at which the fluid force on said pad equals the weight of said pad and the spring preload force applied to said stem.

2. The combination of claim 1 in which said journal is operated horizontally.

3. The combination of claim 1 in which a gas is used as the fluid medium.

4. The combination of claim 1 in which said spring means has a small spring gradient thereby said pad is operated at substantially constant load at speeds exceeding said second speed.

5. The combination of claim 1 in which a stop means is provided to limit the travel of said stem outward along the axis thereof so as to limit the pivot circle clearance ratio to a stable value at speeds beyond said second speed.

References Cited

UNITED STATES PATENTS 3,202,464   8/1965   Chaboseau _____ 308—73

MARTIN P. SCHWADRON, Primary Examiner

F. SUSKO, Assistant Examiner

U.S. Cl. X.R.

308—121